United States Patent [19]

Suzuki et al.

[11] Patent Number: 4,560,025
[45] Date of Patent: Dec. 24, 1985

[54] PART-TIME FOUR-WHEEL DRIVE SYSTEM HAVING LOCKING CLUTCHES BETWEEN WHEEL AND AXLE SHAFT

[75] Inventors: Kunihiko Suzuki, Sagamihara; Koji Enomoto, Ebina, both of Japan

[73] Assignee: Nissan Motor Company, Limited, Japan

[21] Appl. No.: 594,906

[22] Filed: Apr. 16, 1984

[30] Foreign Application Priority Data

May 23, 1983 [JP] Japan ................................ 58-90392

[51] Int. Cl.⁴ ........................................... B60K 17/34
[52] U.S. Cl. .................................. 180/247; 340/52 R
[58] Field of Search ............... 180/247, 248, 249, 250, 180/233; 340/52 R, 52 D

[56] References Cited

U.S. PATENT DOCUMENTS 4,381,828  5/1983  Lunn et al. ........................... 180/247
4,433,748  2/1984  Satoh et al. ........................... 180/247

FOREIGN PATENT DOCUMENTS 53-147152  12/1978  Japan .
54-108315   8/1979  Japan .

OTHER PUBLICATIONS

Nissan Service Shuho published by Nissan Motor Company, Limited, No. 461(160-2), pp. 37–40.

Primary Examiner—John A. Pekar
Attorney, Agent, or Firm—Lane and Aitken

[57] ABSTRACT

A part-time type four-wheel drive vehicle has automatic locking clutches which are automatically engaged to connect the front wheels with their axle shafts when the vehicle is moved in the four-wheel drive mode, and can be disengaged by rotating the axle shafts in the reverse direction in the two-wheel drive mode. The vehicle is further provided with a rotation sensor for sensing a rotation of the front propeller shaft or other member for driving the front wheels, and an indicator for informing the driver of the engagement of the automatic locking clutches if the front propeller shaft is rotating. The vehicle may be further provided with a vehicle movement sensor.

13 Claims, 4 Drawing Figures

PART-TIME FOUR-WHEEL DRIVE SYSTEM HAVING LOCKING CLUTCHES BETWEEN WHEEL AND AXLE SHAFT

BACKGROUND OF THE INVENTION

The present invention relates to a part-time four-wheel drive vehicle which is arranged to improve fuel economy.

A four-wheel drive vehicle is superior in its ability for hill climbing and ability for rough road driving. If, however, all four wheels are always driven at the same speed, a four-wheel drive vehicle cannot be turned smoothly. During a turn at a large steering angle of the steerable wheels, the front wheel of an inner or outer side must travel along a circle having a large radius and the rear wheel of the same side must travel along a small circle. Because of these differences in turning radius, there arises a large difference between a rotational speed (an average rotational speed, to be exact) of the front wheels and a rotational speed (an average rotational speed) of the rear wheels. If a vehicle in a four-wheel drive mode is forced to turn through a tight corner, abnormally great torques are exerted on the ends of front and rear propeller shafts and axle shafts. Therefore, the steering of the vehicle becomes very heavy, and there arises a danger of damage to the propeller shafts and axle shafts. Furthermore, the front wheels and the rear wheels slip in the opposite directions during a turn, so that the tendency to understeer is increased, and there arises an abnormal tire friction (called tight corner brake) which tends to brake the vehicle and causes an engine stall.

To overcome these handling and tire friction problems, some four-wheel drive vehicles are provided with a changeover means capable of changing the state of the four-wheel drive system between a two-wheel drive mode and a four-wheel drive mode. This type of four-wheel drive is called a part-time type. A part-time type four-wheel drive vehicle can be turned through a tight corner smoothly by holding the drive system in the two-wheel drive mode.

Some four-wheel drive vehicles of the part-time type are further provided with locking clutches. Each of the locking clutches is provided between an axle shaft and a part-time drive wheel which is disconnected from the engine when in the two wheel drive mode. Each of the locking clutches is automatically engaged to connect the part-time drive wheel and its axle shaft when the vehicle is driven in the four-wheel drive mode, and cannot be disengaged until the axle shaft is rotated in the opposite direction. Thus, the locking clutches of this type can avoid a detrimental and dangerous shock which would be exerted on the drive system if the locking clutches are engaged or disengaged while the vehicle is moving. Examples of such locking clutches are disclosed in Japanese Patent provisional publications No. 53-147152 and No. 54-108315, and Nissan service shuho published by Nissan Motor Company Limited, No. 461(160-2), pages 37–40.

However, a part-time four-wheel drive vehicle having such locking clutches has some disadvantages. The locking clutches of this type are held engaged unless the axle shafts are rotated in the reverse direction by moving the vehicle backwards. Therefore, there is a large possibility that the locking clutches remain engaged while the vehicle is moving in the two-wheel drive mode, and accordingly the axle shafts, the propeller shaft and other members of the drive system are driven uselessly by the part-time drive wheels which are disconnected from the engine and roll on the road surface, resulting in deterioration of fuel economy of the vehicle and occurrence of disagreeable noises. In order to know whether the locking clutches are engaged or disengaged, it is necessary to shift the drive system to the four-wheel drive mode while the vehicle is moving. The driver can estimate that the locking clutches are engaged if the drive system is smoothly shifted to the four-wheel drive mode during vehicle movement. If gear noises are produced by this shifting operation, the driver can estimate that the locking clutches are disengaged. Such a shifting operation is very troublesome for the driver.

SUMMARY OF THE INVENTION

It is an object of the invention to improve a part-time four-wheel drive vehicle having automatic locking clutches so that a driver can readily know the engagement or the disengagement of the automatic locking clutches.

According to the present invention, a four-wheel drive vehicle comprises an engine, a pair of first wheels, a pair of second wheels, a four-wheel drive system, rotation sensing means, and indicating means. The four-wheel drive system is capable of transmitting power from the engine to the first wheels and the second wheels when the four-wheel drive system is in a four-wheel drive mode, and transmitting power from the engine only to the second wheels when the four-wheel drive system is in a two-wheel drive mode. The four-wheel drive system comprises first wheel drive means capable of being connected with the first wheels for driving the first wheels, and locking clutch means disposed between the first wheels and the first wheel drive means for connecting the first wheels with the first drive means when the locking clutch means is engaged, and disconnecting the first wheels from the first wheel drive means when the locking clutch means is disengaged. The rotation sensing means detects whether the first wheel drive means is rotating or stationary. The indicating means is connected with the rotation sensing means for presenting a first indication indicative of the engagement of the locking clutch means when the first wheel drive means is rotating.

The four-wheel drive vehicle of the present invention may further comprise vehicle movement sensing means for detecting whether the vehicle is moving or stationary, and the indicating means may comprise control means and an indicator. In this case, the control means is connected with the rotation sensing means and the vehicle movement sensing means, and produces an output signal which is in a first signal state if the vehicle is moving and the first wheel drive means is rotating, and in a second signal state if the vehicle is moving and the first wheel drive means is stationary. The indicator is connected with the control means to receive the output signal of the control means. The indicator presents the first indication indicative of the engagement of the locking clutch means when the output signal of the control means is in the first signal state, and a second indication indicative of the disengagement of the locking clutch means when the output signal of the control means is in the second signal state.

DETAILED DESCRIPTION OF THE INVENTION

Figure 1:
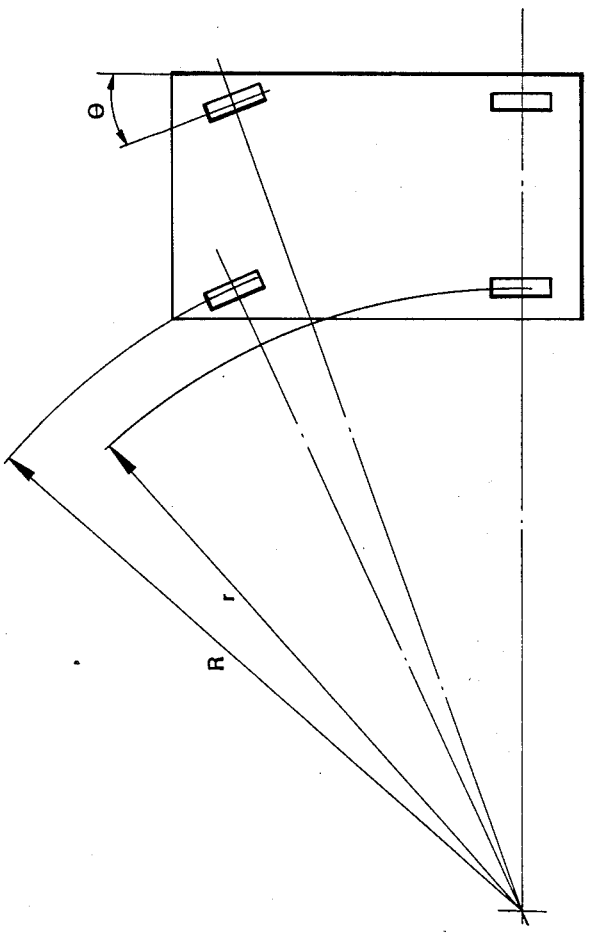
FIG. 1 is a plan view of a vehicle, showing a turning radius difference between front wheels and rear wheels when a steering angle of the steerable wheels is large.
Figure 2:
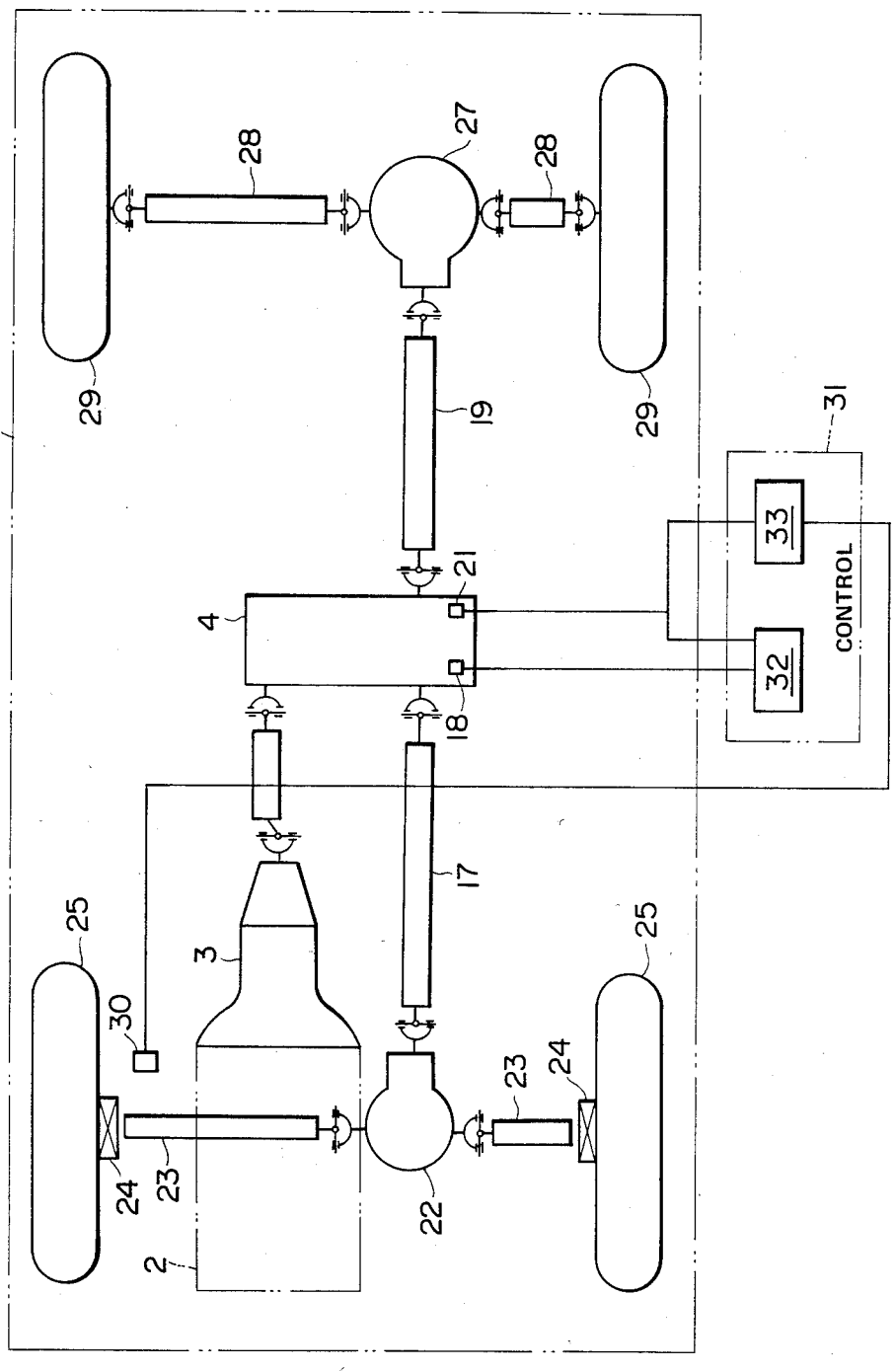
FIG. 2 is a schematic plan view of a four-wheel drive vehicle of one embodiment of the present invention.
Figure 3:
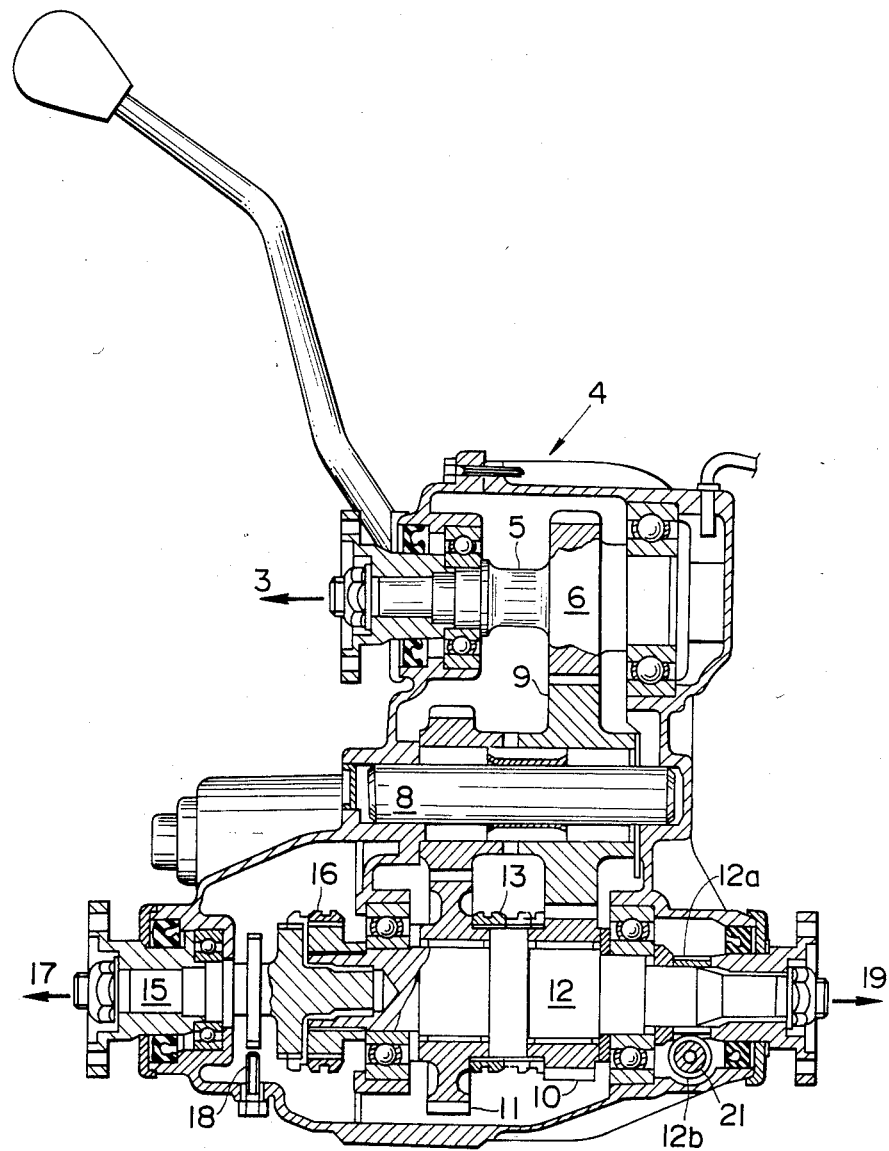
FIG. 3 is a sectional side elevation of a transfer shown in FIG. 2.

One embodiment of the present invention is shown in FIGS. 2 and 3. In FIG. 2, an engine 2 is mounted on a vehicle body 1. The engine 2 is connected with a transmission 3, which is connected with a transfer or transfer case 4. FIG. 3 shows the transfer 4 in detail. Referring to FIG. 3, a main shaft 5 is connected with the transmission 3. A main gear 6 is fixedly mounted on the main shaft 5. The main gear 6 is in mesh with a counter gear 9 which is rotatably mounted on a counter shaft 8. The counter gear 9 has a first toothed rim having a larger diameter and a second toothed rim having a smaller diameter. The first toothed rim of the larger diameter is in mesh with a high speed gear 10, and the second toothed rim of the smaller diameter is in mesh with a low speed gear 11. The high speed gear 10 and the low speed gear 11 are rotatably mounted on a rear drive shaft 12. A clutch 13 can connect either the high speed gear 10 or the low speed gear 11 with the rear drive shaft 12 so that the rear drive shaft 12 rotates integrally with the connected gear 10 or 11. With this arrangement, the transfer 4 can be shifted to any one of a high speed position, a low speed position and a neutral position. A front drive shaft 15 is disposed in alignment with the rear drive shaft 12. A rear end of the front drive shaft 15 is adjacent to a front end of the rear drive shaft 12. A clutch 16 can connect the rear drive shaft 12 and the front drive shaft 15 so that both shafts rotate together. When the front and rear drive shafts 15 and 12 are disconnected from each other by the clutch 16, both shafts 15 and 12 can rotate freely relative to each other. The front drive shaft 15 is connected with a front propeller shaft 17, as shown in FIG. 2. The rear drive shaft 12 is connected with a rear propeller shaft 19. The transfer 4 is in a two-wheel drive mode when the clutch 16 allows the rear drive shaft 12 and the front drive shaft 15 to rotate freely relative to each other. The transfer 4 is in a four-wheel drive mode when the clutch 16 prevents the relative rotation between the rear drive shaft 12 and the front drive shaft 15.

A rotation sensor 18 is provided near the front drive shaft 15. The rotation sensor 18 has a rotating portion which rotates integrally with the front drive shaft 15 and a stationary portion closely facing the rotating portion. The rotation sensor 18 can detect whether the front drive shaft 15 and the front propeller shaft 17 are rotating or not.

A vehicle speed sensor 21 is provided in and near the rear drive shaft 12. The vehicle speed sensor 21 has a speed meter drive gear 12a formed in the rear drive shaft 12, and a pinion 12a engaging with the speed meter drive gear 12a.

As shown in FIG. 2, a front end of the front propeller shaft 17 is connected with a front differential 22. The front differential 22 is connected with front right and left axle shaft 23. The front right axle shaft 23 is connected with a front right wheel 25 through a right automatic locking clutch 24. The front left axle shaft 23 is connected with a front left wheel 25 through a left automatic locking clutch 24.

When the vehicle is moved in the four-wheel drive mode, each of the automatic locking clutches 24 automatically connects the corresponding axle shaft 23 and a wheel hub of the corresponding front wheel 25 so that they rotate integrally. When the drive system is shifted to the two-wheel drive mode and the front axle shafts 23 are rotated in the reverse direction by moving the vehicle backwards, the automatic locking clutches 24 are disengaged so that the front axle shafts 23 are disconnected from the wheel hubs fixed to the front wheels 25.

A rear end of the rear propeller shaft 19 is connected with a rear differential 27. The rear differential 27 is connected with rear right and left axle shafts 28. The rear right axle shaft 28 is always connected with a hub fixed to a rear right wheel 29, and the rear left axle shaft 28 is always connected with a hub fixed to a rear left wheel 29. Thus, the driving power can be always transmitted to the rear wheels 29.

An indicator 30 is disposed near a driver's seat in the vehicle body 1.

A control unit 31 is connected with the rotation sensor 18 and the vehicle speed sensor 21 to receive signals from these sensors. In accordance with these signals, the control unit 31 controls the indicator 30. The control unit 31 has a first section 32 for deciding whether the automatic locking clutches 24 are engaged or disengaged, and a second section 33 for deciding whether a current indication of the indicator 30 should be continued or not.

The transfer 4 can be changed from the four-wheel drive mode to the two-wheel drive mode by shifting a transfer control lever to a 2H position (i.e. a two-wheel drive, high speed position). However, the automatic locking clutches 24 remain engaged if the driver fails to move the vehicle backwards through a short distance (about 1 m). In this state, the front wheels 25 rolling on the road surface drive the front axle shafts 23, and the front propeller shaft 17. Therefore, the front axle shafts 23 and the front propeller shaft 17 rotate uselessly, and they cause poor fuel economy of the vehicle and undesirable noise.

Figure 4:
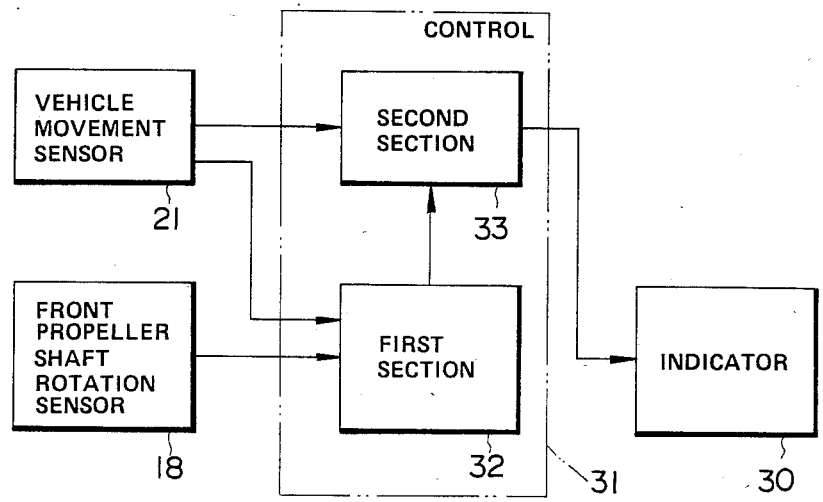
FIG. 4 is a block diagram of a control system shown in FIG. 2.

During this, the rotation sensor 18 detects that the front drive shaft 15 is rotating, and sends a signal indicative of the detected condition to the control unit 31. Simultaneously, the vehicle speed sensor 21 detects that the vehicle is moving, and sends a signal indicative of the detected condition of the vehicle to the control unit 31. The signals from the rotational sensor 18 and the vehicle speed sensor 31 are inputted to the first section 32 of the control unit 31, as shown in FIG. 4. The first section 32 decides that the automatic locking clutches 24 are engaged while the vehicle is moving, and sends a signal indicative of the decided condition of the locking clutches 24 to the second section 33 of the control unit 31. In response to the signal from the first section 32, the second section 33 decides to indicate the engagement of the locking clutches 24, and sends a signal to the indicator 30. In response to the signal from the second section 33, the indicator 30 produces an indication from which the driver can understand that the automatic locking clutches 24 remain engaged while the vehicle is moving.

If the vehicle is stopped thereafter, the vehicle speed sensor 21 detects that the vehicle is stationary, and sends a signal indicative of the detected condition of the vehicle to the second section 33 of the control unit 31. In response to the signal from the vehicle speed sensor 21, the second section 33 decides to make the indicator 30 continue the indication indicative of the engagement of the automatic locking clutches 24, and sends its signal to the indicator 30. In response to the signal from the second section 33, the indicator 30 continues to indicate the engagement of the automatic locking clutches 24. Thus, the driver can know the engagement of the automatic locking clutches 24 even when the vehicle is at rest.

Thus, the driver can easily know whether the locking clutches 24 are engaged or not, without the need of shifting the transfer control lever to the four-wheel drive position while the vehicle is moving. Therefore, the driver can disengage the locking clutches 24 immediately, and prevent deterioration of the fuel economy and occurrence of noises.

If the driver disengages the locking clutches 24 by holding the transfer control lever in the 2H position and moving the vehicle slightly backwards, and restarts to run the vehicle, then the rotation sensor 18 detects that the front drive shaft 15 connected with the front propeller shaft 17 is not rotating, and sends its signal indicative of the detected condition of the front drive shaft 15 to the control unit 31. The vehicle speed sensor 21 detects that the vehicle is moving, and sends its signal to the control unit 31. The signals of the rotation sensor 18 and the vehicle speed sensor 21 are inputted to the first section 32 of the control unit 31. In response to these signals, the first section 32 decides that the locking clutches 24 are not engaged while the vehicle is moving, and sends its signal indicative of the decided condition to the second section 33 of the control unit 31. In response to the signal from the first section 32, the second section 33 decides to indicate the disengagement of the locking clutches 24, and sends its signal to the indicator 30. In response to the signal from the second section 33, the indicator 30 produces an indication from which the driver can understand that the automatic locking clutches 24 are disengaged while the vehicle is moving.

Figure 5:
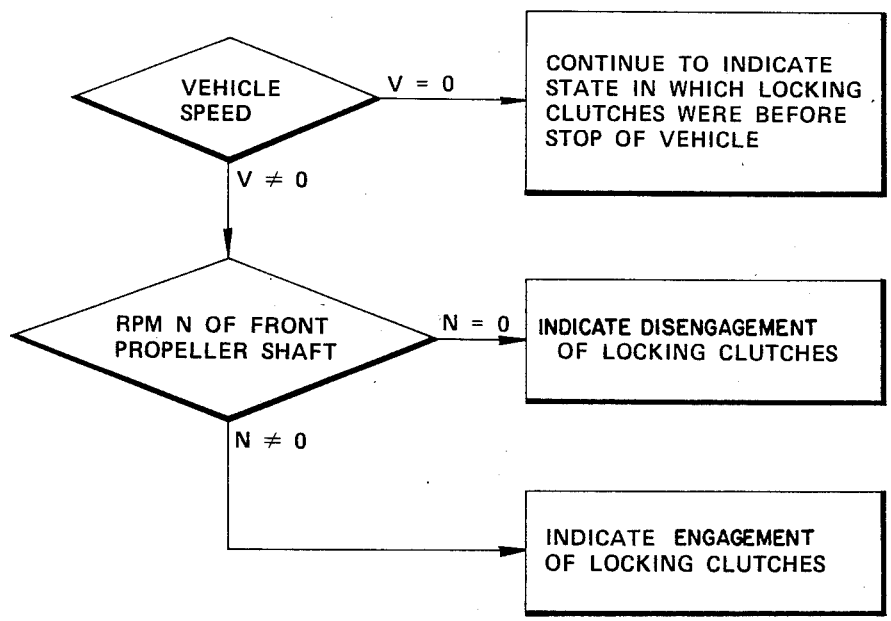
FIG. 5 is a flowchart for the control system of FIG. 4.

If the vehicle is stopped thereafter, the vehicle speed sensor 21 detects that the vehicle is stationary, and sends its signal indicative of the detected condition of the vehicle to the second section 33 of the control unit 31. In response to the signal from the vehicle speed sensor 21, the second section 33 decides to make the indicator 30 continue the indication indicative of the disengagement of the locking clutches 24, and sends its signal to the indicator 30. In response to the signal from the second section 33, the indicator 30 continues to indicate the disengagement of the locking clutches 24. Thus, the driver can easily know the disengagement of the locking clutches 24 even when the vehicle is at rest. Therefore, the driver can easily decide that it is not necessary to take action to disengage the locking clutches. Thus, the control unit 31 is arranged to control the indicator 30 as shown in FIG. 5.

The vehicle speed sensor 21 is not always necessary. When the vehicle speed sensor 21 is eliminated, the indication of the indicator 30 is made only while the vehicle is moving. In this case, too, the driver can easily know whether the locking clutches 24 are engaged or not without shifting the transfer to the four-wheel drive mode during vehicle movement. Furthermore, the circuitry of the control unit 31 can be simplified by eliminating the vehicle speed sensor 21, so that the manufacturing cost of the vehicle can be reduced.

It is optional to dispose the rotation sensor 18 near the front propeller shaft 17 or one of the front axle shafts 23, or other member connected between the transfer 4 and the locking clutches 24 for transmitting power from the transfer to the locking clutches 24.

What is claimed is:

1. A four-wheel drive vehicle comprising:
   an engine,
   a pair of first wheels and a pair of second wheels,
   a four-wheel drive system capable of transmitting power from said engine to said first wheels and said second wheels when said four-wheel drive system is in a four-wheel drive mode, and transmitting power from said engine only to said second wheels when said four-wheel drive system is in a two-wheel drive mode, said four-wheel drive system comprising first wheel drive means capable of being connected with said first wheels for driving said first wheels, and locking clutch means disposed between said first wheels and said first wheel drive means for connecting said first wheels with said first wheel drive means when said clutch means is engaged and disconnecting said first wheels from said first wheel drive means when said clutch means is disengaged,
   rotation sensing means for detecting whether said first wheel drive means is rotating or stationary, and
   indicating means, connected with said rotation sensing means, for presenting a first indication indicative of the engagement of said clutch means when said first wheel drive means is rotating.

2. A vehicle according to claim 1, wherein said locking clutch means is automatically engaged when the vehicle is moved in the four-wheel drive mode, and said locking clutch means can be disengaged by changing said four-wheel drive system to the two-wheel drive mode and causing said first wheel drive means to rotate in the reverse direction.

3. A vehicle according to claim 2, further comprising vehicle movement sensing means for detecting whether the vehicle is moving or stationary, and wherein said indicating means comprises control means and an indicator, said control means being connected with said rotation sensing means and said vehicle movement sensing means to receive signals therefrom, said control means producing an output signal which is in a first signal state if the vehicle is moving and said first wheel drive means is rotating, and in a second signal state if the vehicle is moving and said first wheel drive means is stationary, said indicator being connected with said control means to receive the output signal of said control means, said indicator presenting said first indication when the output signal of said control means is in the first signal state, and a second indication indicative of the disengagement of said clutch means when the output signal of said control means is in the second signal state.

4. A vehicle according to claim 3, wherein the output signal of said control means is maintained in a third signal state while the vehicle is stationary, and wherein said indicator is in a third indicator state when the output signal of said control means is in the third signal state.

5. A vehicle according to claim 4, wherein the third signal state of the output signal of said control means is equal to the first signal state if the output signal is in the first signal state immediately before the vehicle is stopped, and the second signal state if the output signal is in the second signal state immediately before the vehicle is stopped.

6. A vehicle according to claim 5, wherein said control means comprises a first decision section having a first input terminal connected with said rotation sensing means, a second input terminal connected with said vehicle movement sensing means and an output terminal, and a second section having a first input terminal connected with said vehicle movement sensing means, a second input terminal connected with the output terminal of said first decision section and an output terminal connected with said indicator for sending the output signal of said control means to said indicator, the output terminal of said first decision section being in a first answer state if the vehicle is moving and said first wheel drive means is rotating, and in a second answer state if the vehicle is moving and said first wheel drive means is stationary, said second section maintaining the output signal of said control means in the first signal state if the output terminal of said first decision section is in the first answer state, and in the second signal state if the output terminal of said first decision section is in the second answer state.

7. A vehicle according to claim 6, wherein said four-wheel drive system comprises transfer means for changing said four-wheel drive system between the four-wheel drive mode and the two-wheel drive mode, engine-side drive means for transmitting power from said engine to said transfer means, and second wheel drive means connected between said transfer means and said second wheels for transmitting power from said transfer means to said second wheels.

8. A vehicle according to claim 7, wherein said first wheel drive means comprises a first propeller shaft, a pair of first axle shafts connected, respectively, with said first wheels, and a first differential connected between said first axle shafts.

9. A vehicle according to claim 8, wherein said first wheel drive means further comprises a first drive member connected with said first propeller shaft for driving said first propeller shaft, said second wheel drive means comprises a second drive member for driving said second wheels, and said transfer means comprises a clutch for connecting said first and second drive members so that they rotate together, and disconnecting said first drive member from said second drive member.

10. A vehicle according to claim 9, wherein said locking clutch means comprises a pair of locking clutches one of which is disposed between one of said first wheels and its first axle shaft, and the other of which is disposed between the other of said first wheels and its first axle shaft.

11. A vehicle according to claim 10, wherein said vehicle movement sensing means is a vehicle speed sensor capable of detecting whether the speed of the vehicle is zero or not.

12. A vehicle according to claim 11, wherein said rotation sensing means senses a rotation of said first drive member.

13. A vehicle according to claim 12, wherein said first wheels are front wheels of the vehicle, and said second wheels are rear wheels of the vehicle.

* * * * *